V. S. HARDEY.
MAXIMUM DEMAND INDICATOR.
APPLICATION FILED JULY 17, 1911.
1,057,640.
Patented Apr. 1, 1913.
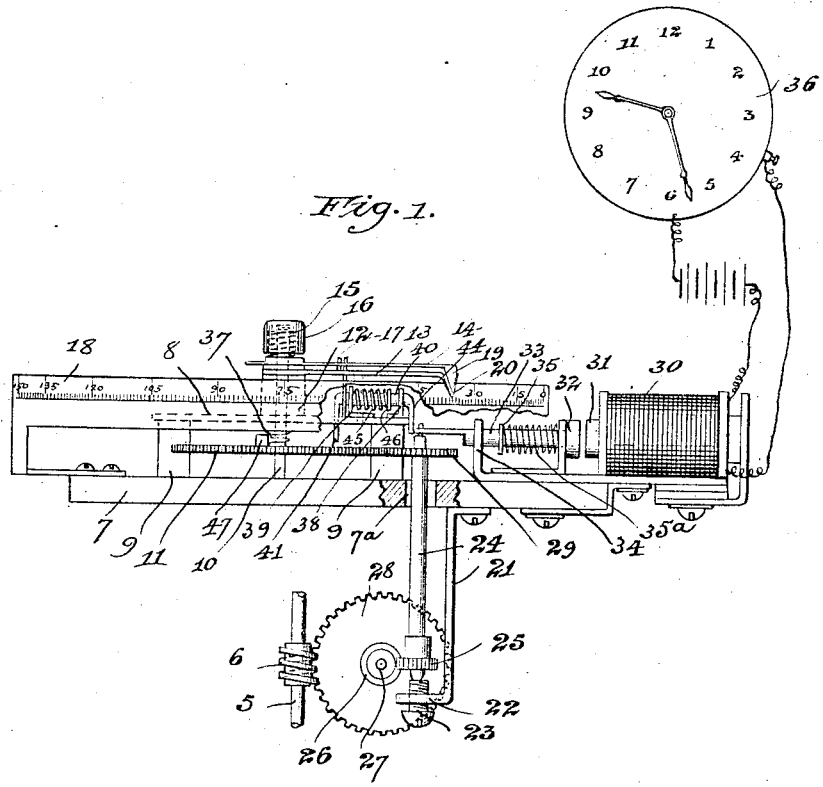
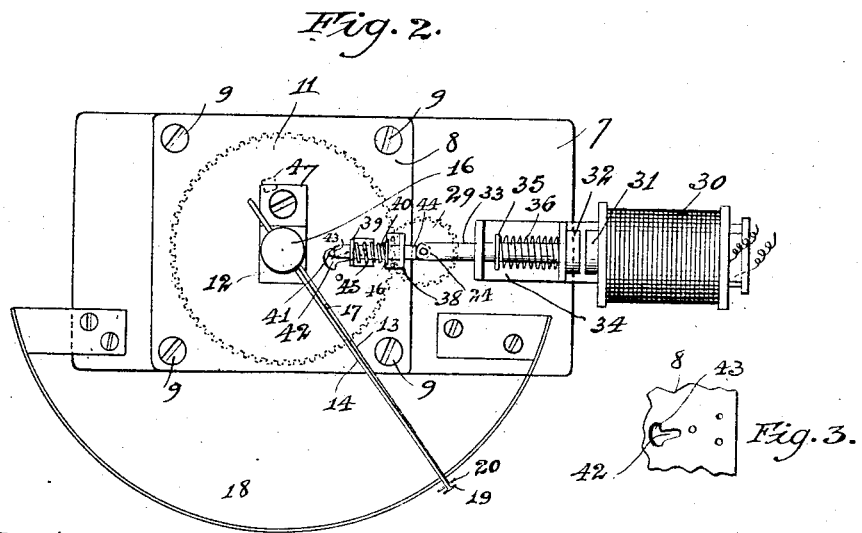
Witnesses,
Inventor,
Virgil S. Hardey

UNITED STATES PATENT OFFICE.

VIRGIL S. HARDEY, OF CHICAGO, ILLINOIS.

MAXIMUM-DEMAND INDICATOR.

1,057,640.   Specification of Letters Patent.   Patented Apr. 1, 1913.

Application filed July 17, 1911. Serial No. 638,928.

*To all whom it may concern:*

Be it known that I, VIRGIL S. HARDEY, a citizen of the United States, residing at Chicago, in the county of Cook and State of Illinois, have invented certain new and useful Improvements in Maximum-Demand Indicators, of which the following is a specification.

The principal object of my invention is to provide an improved apparatus designed as an attachment for the ordinary electrical current meter for indicating the amount of electrical current passing through the meter at all times and also indicating the maximum current or demand of the electrical circuit during predetermined times.

To these ends my invention consists of an attachment provided with an ordinary indicator hand, positively driven, and a maximum demand indicator hand movable by the positive hand, both hands adapted to travel across the face of a dial.

A further object of my invention is to provide means for returning the ordinary hand to its initial starting position at predetermined intervals.

To these ends my invention consists of the apparatus shown in the accompanying drawing, in which—

Figure 1 is an edge elevational view thereof, with parts broken away. Fig. 2 is a top plan view of Fig. 1. Fig. 3 is an enlarged detail fragmentary view.

Referring now more particularly to the drawing, inasmuch as the ordinary meters for recording the current of electricity in the circuit, and to which my device is adapted to be attached, are of old and well known constructions, it is not thought necessary to show such a meter in the drawings and it will be sufficient to state that the shaft 5 is a positively driven part of the ordinary meter and continuously rotated thereby, such for instance, as an armature shaft. This shaft carries a worm gear 6.

The indicator attachment comprises a base plate 7 adapted to be suitably secured to the frame of the meter. A plate 8 is supported above the base plate 7 by four legs 9. A shaft 10 having a bearing, at its lower end, in the base plate 7 and extending through and projecting above the plate 8, carries a gear 11 provided with suitable teeth; the gear being preferably mounted between the plates 7 and 8. That portion of the shaft 9 extending above the plate 8 has a bearing, near its top, in a bracket 12 which is secured to the plate 8. The ordinary indicator hand 13 is fixed to the shaft 10, preferably below the bracket 12, while the maximum demand hand 14 is pivotally mounted on the shaft 10 above the bracket 12. A spring 15 surrounds the upper end of the shaft 10 and bears against the hand 14, the spring being confined by a cap 16 mounted upon the upper end of the shaft 10. The spring 15 is very light, its sole purpose being to hold the hand 14 in such position as it may be moved into but affording no great amount of resistance to the movement of the hand. The arm 13 carries a stud 17 which is of sufficient length to engage the arm 14, thereby carrying the latter arm with it when the former arm is moved. A suitable dial 18 is secured to the plate 7 and across the face of which the downwardly pointed ends 19 and 20 of the demand and ordinary hands, travel. A bracket 21 secured to the underside of the base plate 8 terminates, at its lower end, in a horizontal support 22 in which a bearing 23 is adjustably mounted. A movable shaft 24 rests at its lower end on the bearing 23 and is provided with a pinion gear 25, at its lower end, in mesh with a worm gear 26 mounted on a stud shaft 27 that is secured to the gear 28; the latter gear being in mesh with the worm gear 6. An opening 7ª is formed in the base plate 7 and through which the shaft 24 extends; the diameter of said opening being considerably larger than the diameter of the shaft 24 so as to permit lateral movement of the shaft therein. Said shaft 24 carries a gear 29 at its upper end the teeth of which are brought into and out of engagement with the teeth of the gear 11. An electromagnet 30 is suitably supported by the brackets 7, the magnetic core 31 of which is in operative relation with the metal head 32 on one end of a plunger 33; the upper end of the shaft 24 being pivotally mounted in the other end of the plunger 33. The plunger is slidably supported in a suitable bracket 34. A shoulder 35 is secured to the plunger and between it and one end of the bracket a spring 35ª is mounted which normally forces the head 32 away from the core 31 so as to bring the gears 11 and 29 into operative relation. Suitable clock mechanism 36 is connected in circuit with the electromagnet and is so designed that at predetermined periods the circuit will be established magnetizing the core 31 for an instant during which time the magnetic influence of the core is sufficient to overcome the tension of the spring 35ª, thereby drawing the head 32 of the plunger 33 in contact with the core 31 and separating the gears 11 and 29. When the gears are so separated, the spring 37 surrounding the shaft 10, one end of which is secured to the shaft and its other end to the gear 11, rotates said gear sufficiently to return the ordinary hand 13 to its normal or starting position, and when so returned the electrical circuit between the clock and the electromagnet is broken by any of the well-known circuit-breaking means now in use, whereupon the spring 35ª forces the head of the plunger 32 away from the magnetic core 31, bringing the gears 11 and 29 again into operative relation.

It will be readily seen from the foregoing description that in the event the positive hand should reach the limit of its movement on the dial 18 and if the electrical circuit was not established between the clock and the magnetic core, that serious injury would result to the mechanism. To provide against such a result, I secure brackets 38 and 39 to the plate 8, the latter bracket being pivoted thereto, and in which brackets a latch 40 is slidably mounted, the ends of which are down-turned, one end 41 projecting through a suitable latch opening 42 (Fig. 3) formed in the plate 8 and having a notch 43 adapted to receive and hold the down-turned end 41. The other end 44 of the latch is adjacent one end of the plunger 33. The end 41 of the latch is normally held within the notch 43 by a spring 45 which surrounds the latch and is confined between the bracket 39 and the shoulder 46 secured to the latch. The stud 47 is mounted on the gear 11 and so positioned as to strike the end 41 of the latch when the positive hand 13 has reached the limit of its movement on the dial and further movement thereof would cause injury to the parts of the mechanism. When the stud 47 thus engages the end 41 of the latch it throws the same from the notch 43 whereupon the spring 45 forces the latch end 44 against the end of the plunger 33, thereby separating the gears 11 and 29 and throwing the device as a whole out of operation. It is understood that the tension of the spring 45 is greater than the tension of the spring 35ª.

The operation and purpose of a device of this character will be thoroughly understood from the foregoing description, by one skilled in the art, but it may be briefly stated as follows: The consumers of electrical current obtain a more advantageous rate or price per kilowatt hour, provided a certain amount of current has been used by the consumer during a certain period. The careful manufacturer or consumer of electrical current desires to know the amount of current being consumed at predetermined periods, as well as whether or not the maximum demand has been reached so that the consumer may procure the lower rate. By attaching my device to a constantly rotating part of the ordinary meter used for measuring electrical current and the ordinary and maximum hands of my device starting at the zero mark on the scale, as the electrical current passes through the meter the shaft 5 is rotated and by means of gear and shaft connections as herein described, the ordinary hand 13 is positively moved along the face of the dial. During its movement it carries with it the maximum demand hand 14. As the indicator is exposed to view a reading thereof may be taken every hour, or at such other periods as may be desired, but it is contemplated in my device that the reading shall be taken hourly and that the electrical circuit shall be established by the clock mechanism at such hourly periods. Assume that during the first hour the ordinary hand reaches the point marked 90 upon the dial, carrying with it the maximum demand hand. At the end of the first hour the magnetic circuit is established, the gear 29 being drawn out of operative relation with the gear 11, whereupon the spring 37 returns the ordinary hand to its initial starting point but leaving the maximum demand hand at the point marked 90. During the successive hours if the current passing through the meter is not sufficient to move the ordinary hand in parallel relation with the maximum demand hand, said maximum demand hand remains in the same position, the consumer then knowing that during said hours the amount of current passing through the meter has not been above 90. In the event, however, that the maximum demand in any succeeding hour becomes greater than during the first hour, the ordinary hand will engage the maximum hand thereby carrying the latter hand forward.

While I have herein shown the preferred embodiment of my invention, it is apparent that there may be many structural changes without in any way departing from the broad, general spirit thereof, and without confining myself, therefore, to the particular details of construction herein shown and described,

I claim:

1. In a device of the character described, the combination with the shaft of an electric meter, of a transmission member operatively connected with said shaft, an indicator hand, a spindle on which said hand is rigidly mounted, a maximum indicator hand pivotally mounted on said spindle to be independent of the rotation thereof, a dial on which both hands indicate, a gear on said spindle normally engaged by said transmission member, and means controlled by the gear in running for effecting disconnection of the transmission member from the gear after the gear has been rotated a predetermined distance by said train.

2. In a device of the character described, the combination with the driving shaft of an electric meter, of a transmission member operatively connected with said shaft, a driven gear, a shaft on which said gear is mounted, an indicator hand rigidly mounted on said gear shaft, a maximum indicator hand pivotally mounted on said gear shaft, an abutment extending from the indicator hand whereby both hands are moved together upon rotation of said gear shaft in one direction, a dial on which both hands indicate, time controlled electro-magnetic means for periodically disconnecting said transmission member and driven gear, means operable independently of said electro-magnetic means and controlled by the gear in running for causing disengagement of the transmission member and gear after the gear has rotated a predetermined distance, and means for restoring the gear to normal position upon such disengagement therefrom of the transmission member.

3. In a device of the character described, the combination with the driving shaft of an electric meter, of a transmission train operatively connected with said shaft, a driven gear, a shaft on which said gear is secured, a main indicating hand rigidly mounted on said gear shaft, a maximum indicating hand loosely mounted on said gear shaft, an abutment for causing said hands to move together upon rotation of the gear shaft in one direction, a dial on which both hands indicate, a spring controlled actuating device, detent means normally restraining said actuating device, said actuating device being adapted when released to effect disengagement of the transmission train and gear, and means controlled by the gear in running for causing release of said actuating device after a predetermined distance of rotation of said gear, whereupon disconnection will be effected between said transmission train and gear, and means for restoring said gear and main indicating hand to normal position upon such disconnection of the transmission train and gear.

4. In a device of the character described, the combination with the shaft of an electric meter, an indicator hand, a shaft on which said hand is mounted, a transmission train for connecting said shafts, and means controlled by the train in running for interrupting said transmission train after said indicator hand has been moved a predetermined distance.

VIRGIL S. HARDEY.

Witnesses:
SADIE M. RYAN,
JAMES R. OFFIELD.

---

Copies of this patent may be obtained for five cents each, by addressing the "Commissioner of Patents, Washington, D. C."